Dec. 30, 1947.                R. B. COTTON                2,433,437
           SIMULTANEOUS AIR PICKUP AND DELIVERY SYSTEM
              Filed March 28, 1946        6 Sheets-Sheet 1
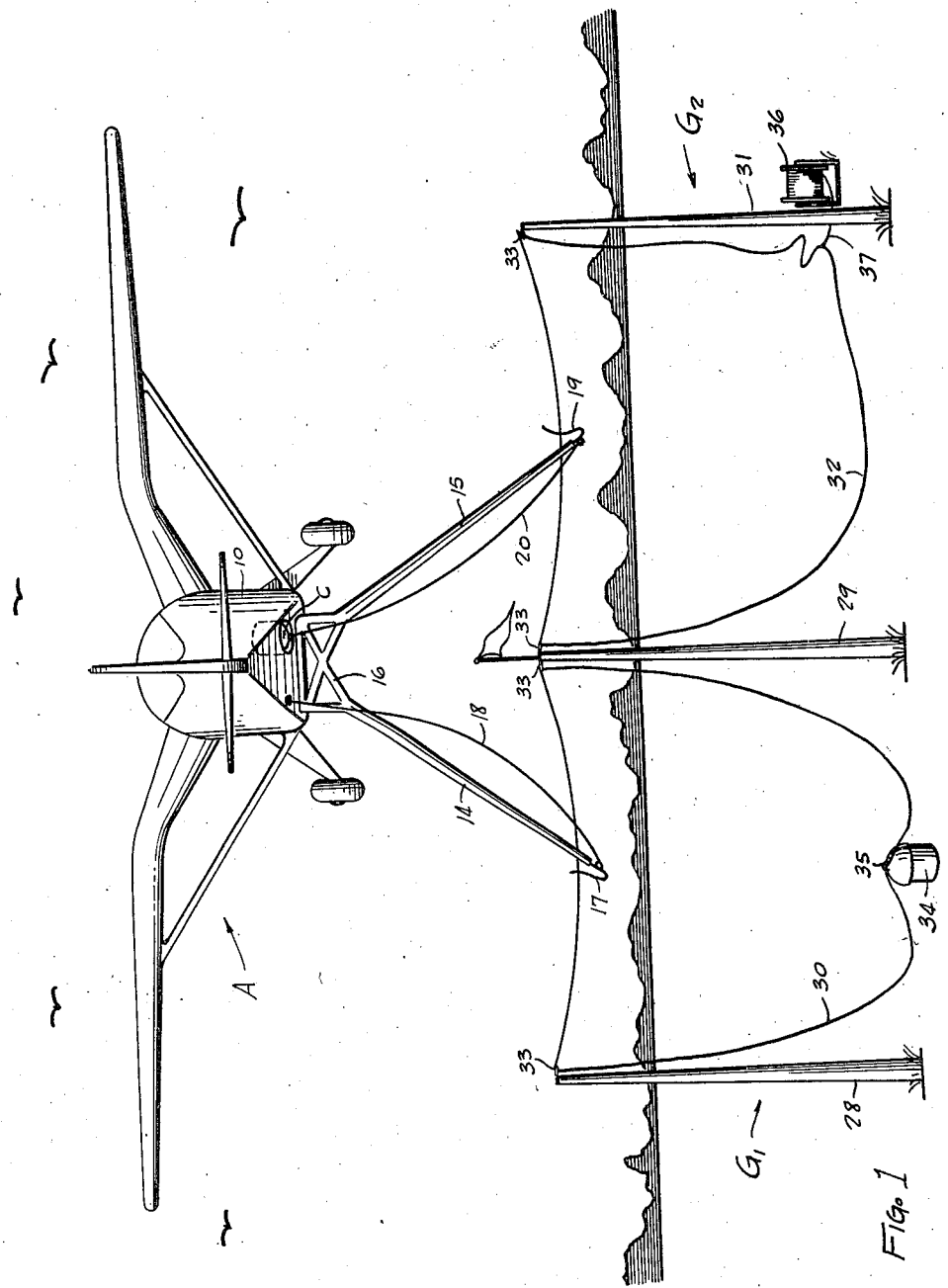
INVENTOR.
ROBERT B. COTTON.
BY
HIS ATTORNEY.

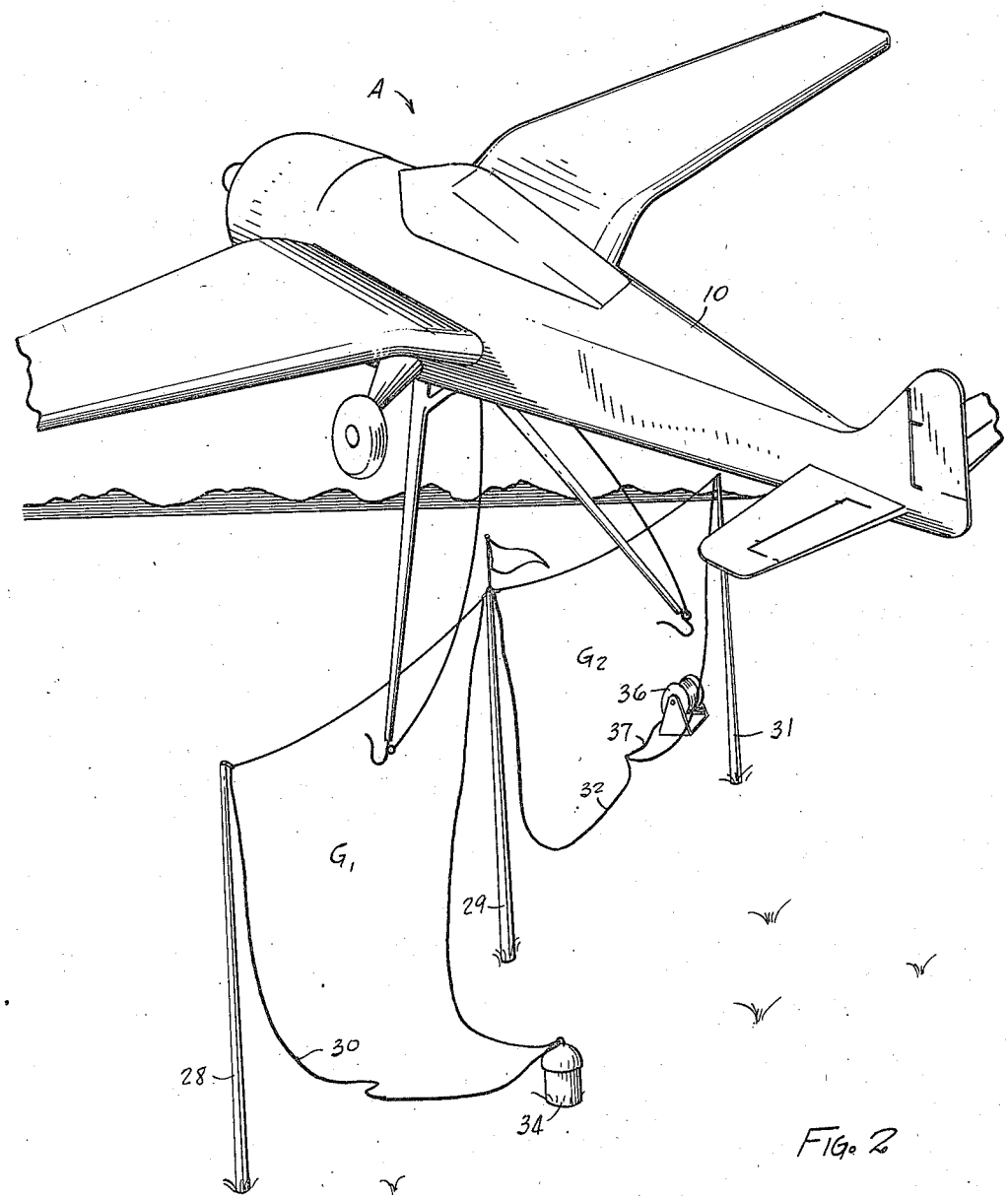

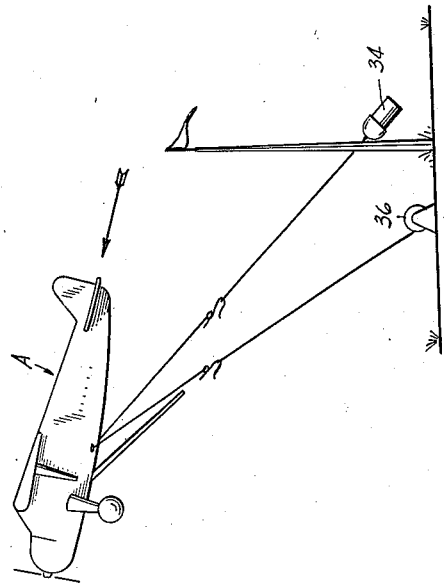
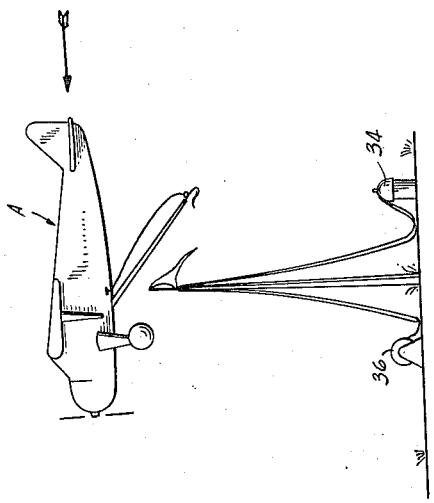

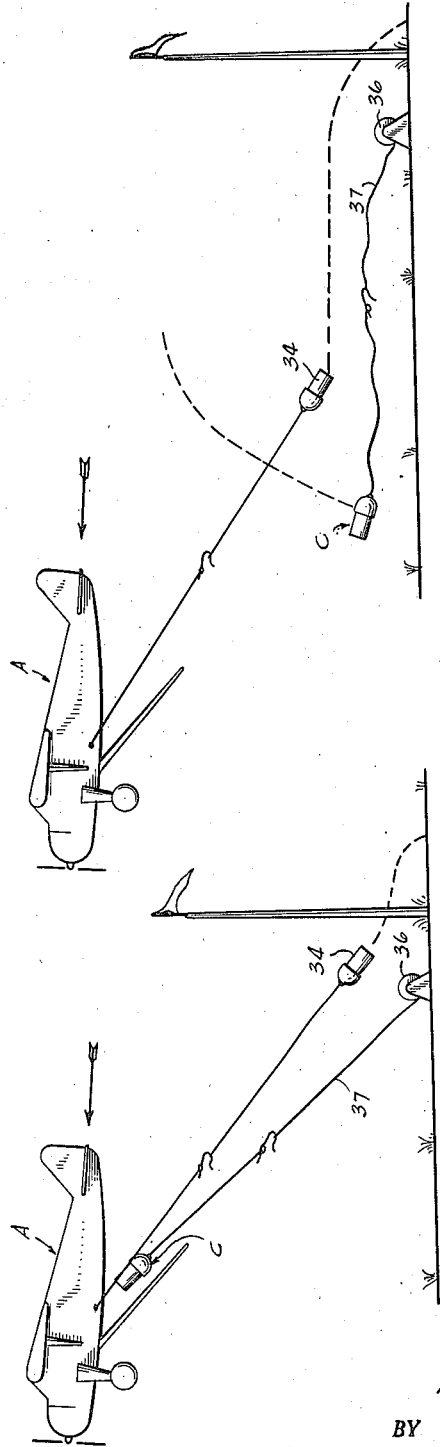

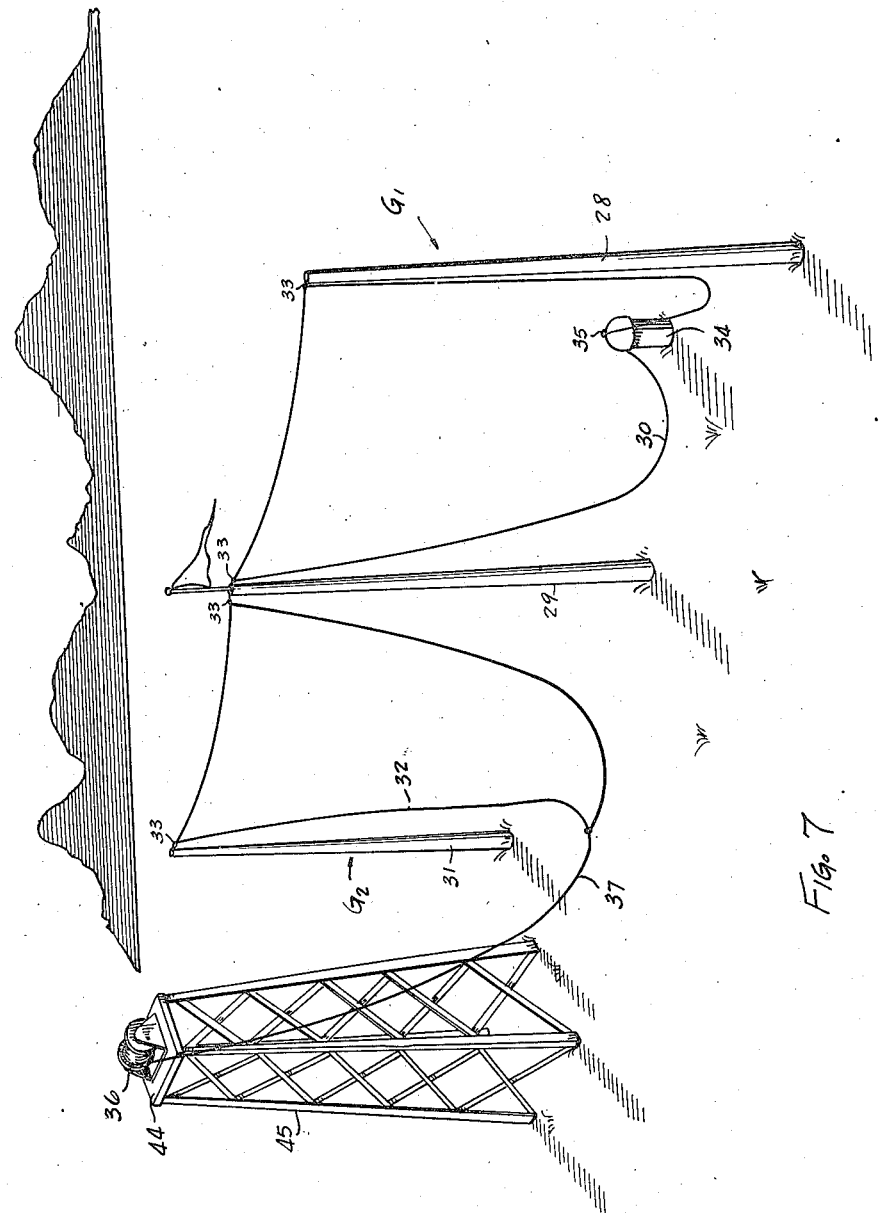

Dec. 30, 1947. R. B. COTTON 2,433,437
SIMULTANEOUS AIR PICKUP AND DELIVERY SYSTEM
Filed March 28, 1946 6 Sheets-Sheet 6
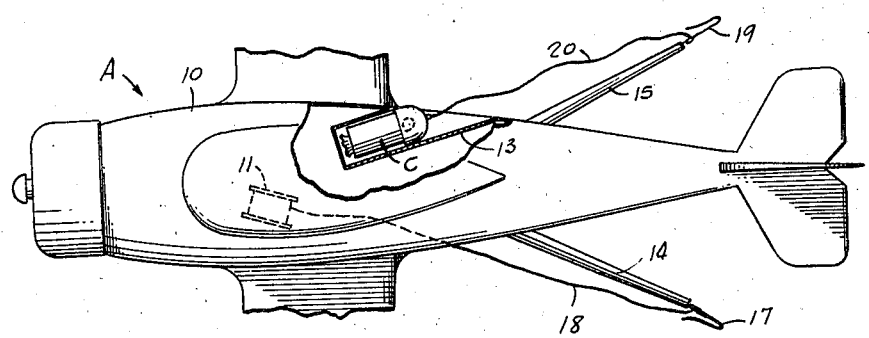
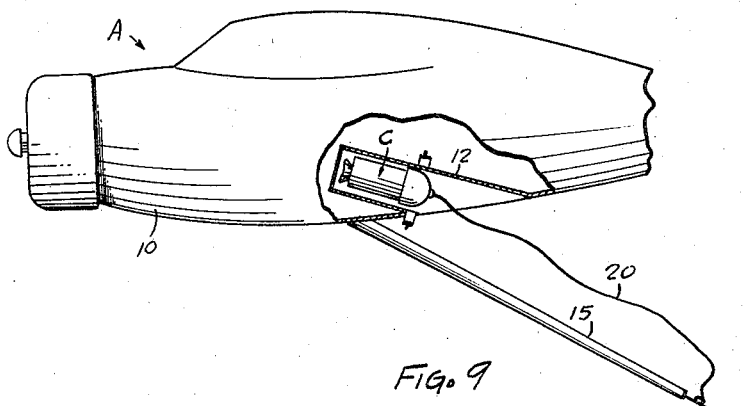
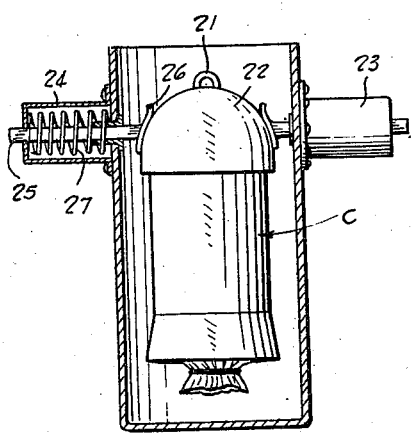
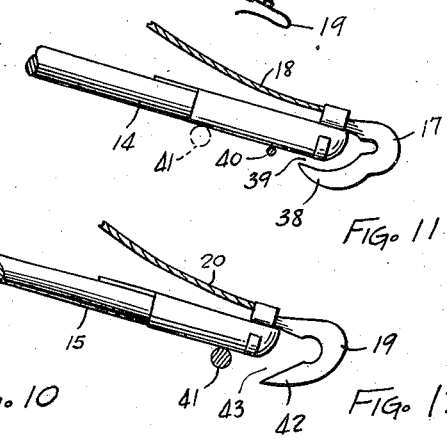
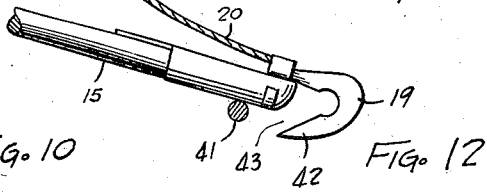
INVENTOR.
ROBERT B. COTTON
BY
HIS ATTORNEY.

Patented Dec. 30, 1947

2,433,437

UNITED STATES PATENT OFFICE 2,433,437

SIMULTANEOUS AIR PICKUP AND DELIVERY SYSTEM

Robert B. Cotton, Lansdowne, Pa., assignor to All American Aviation, Inc., Wilmington, Del., a corporation of Delaware Application March 28, 1946, Serial No. 657,871

9 Claims. (Cl. 258—1.8)

This invention relates to air pick-up and is concerned primarily with the provision of simultaneous pick-up and delivery operations.

At the present time the art of air pick-up is well established and recognized as a thing accomplished. There is at least one air line which has been making regularly scheduled runs over established routes since 1939 and these operations are essentially air pick-up, i. e., mail is picked up from the ground without stopping and other mail is delivered by being dropped from the aircraft. In accordance with what is now recognized as conventional practice, a container encasing the mail to be dropped at any particular location is trailed at the end of a line an appreciable distance back from the fuselage as the aircraft comes in to make a pick-up. At what the flight mechanic determines to be the proper time, this container is released and drops to the ground just before the pick-up is made. There are certain undesirable features which attend this practice and which are intended to be obviated by the claimed invention.

In the first place it is impossible if not highly impractical to achieve even a fair degree of accuracy in the delivery. The container might eventually wind up at some spot over a wide area. This, of course, requires the use of a fairly large plot where the ground station is erected to accommodate this inaccurate delivery.

In the second place, the container when it is released from the aircraft has a velocity substantially equal to that of the aircraft. Thus, when it strikes the ground it is subjected to severe shocks and jars which tend to damage the container and seriously shorten its service life.

With these conditions in mind this invention has in view as its foremost objective the provision of new and improved apparatus for delivering a container from a moving aircraft to a desired location on the ground with a high degree of accuracy. Moreover, this delivery apparatus includes means for neutralizing the forward speed of the aircraft which is imparted to the container before the latter strikes the ground.

In carrying out this idea in a practical embodiment the invention proposes the use of a ground station offering a loop for engagement with contact means on the aircraft and which contact means is connected to the container being delivered. This loop is operatively connected to an energy absorbing unit which is substantially the equivalent of a pick-up unit which is included in the aircraft for the pick-up operation.

A further object of the invention is the provision of apparatus designed particularly to effect simultaneously air pick-up and delivery operations. In achieving this object the aircraft performing the operation is provided with the usual pick-up unit and a pair of contact arms. Detachably carried at the end of one of these arms is a hook which is connected to a line wound on the winch of the pick-up unit. Detachably carried at the extremity of the other arm is a hook that is connected by a line with the container to be delivered. A pair of ground stations are arranged in side by side relation so that the loops held in erected position thereby are adapted for substantially simultaneous engagement by the pick-up arms. One of these loops is connected by a leader to the container which is to be picked up while the other loop is connected to a line that is taken up on the winch of the ground based delivery unit.

When the plane comes in the arms engage the loops together. Both hooks are pulled from the arms. This causes the container to be delivered to be pulled from the aircraft and this operation takes place under the control of the ground based delivery unit. At the same time the other hook is pulled from its contact arm and connects the container to be picked up with the pick-up unit on the aircraft.

A somewhat more detailed objective of the invention is the provision of an aircraft including a chute which is adapted to receive a container being delivered and which chute includes means for yieldably retaining a container therein.

While it is believed that the span of the loops of the ground station are sufficiently wide and the contact arms on the aircraft may be spaced sufficiently far apart to render extremely remote the possibility of the pick-up arm engaging the delivery loop, yet in the interest of abundant precaution the invention has as a further object the provision of apparatus of the character above described which is designed to positively preclude the possibility of effecting a connection between the hook of the pick-up apparatus and the loop of the delivery system. In attaining this end the loop of the delivery system has a diameter appreciably greater than the loop of the pick-up system. The contact arm and pick-up hook are so arranged as to provide just sufficient clearance for the small pick-up loop to enter between the bill of the pick-up hook and the arm and effect the connection. A line of greater diameter such as the delivery loop will not enter this clearance and if through inadvertance it should engage the contact arm and slide down to meet the bill of the pick-up hook, it will merely knock the hook off the arm but will not effect the connection.

A pick-up operation is ordinarily made from a fairly low altitude. If the container is delivered from an aircraft making the pick-up it ordinarily will not fall any distance sufficiently great to cause appreciable damage. Most of the damage and wear and tear on the container is caused by the forward velocity. This forward velocity is neutralized by the delivery unit. However, the invention has in view as a further object the provision of apparatus of the type indicated which includes means for neutralizing or counteracting the gravity action to which the container is subjected in being delivered. In carrying out this idea in a practical embodiment, the line which is taken up on the delivery unit is rendered effective at a point spaced above the ground. This spacing is comparable to the height of the top ply of the ground station loop and may be established either by causing the line to pass over a pulley at that height or mounting the unit itself at such a height. In either event with proper control of the braking instrumentalities of the delivery unit the downward fall of the container may be checked at the same time that its forward velocity is decelerated.

These and other more detailed objects and advantages of the invention will in part become apparent and in part be hereinafter stated as the description of the invention proceeds.

The invention therefore comprises apparatus for simultaneously effecting air pick-up and delivery operations. This apparatus is characterized as including a pair of ground stations offering loops in erected side by side position, and a pair of contact arms on the aircraft making the pick-up and delivery and which arms are adapted to engage said loops. A pick-up unit is included in the aircraft and a line included therein is connected to a hook on the pick-up arm. The container to be delivered is yieldably retained in a chute in the aircraft and is connected to a hook detachably mounted on the delivery arm. The container to be picked-up is connected to the pick-up loop while a ground based energy absorbing delivery unit is connected to the delivery loop.

For a full and more complete understanding of the invention reference may be had to the following description and accompanying drawings wherein:

Figure 1 is a rear view showing an aircraft about to make simultaneous pick-up and delivery operations in accordance with the precepts of this invention.

Figure 2 is a perspective view looking more from one side showing the same operation.

Figure 3 is a view in side elevation, somewhat diagrammatic, showing the relation of the aircraft to the ground station just before contact.

Figure 4 is a side view similar to Figure 3 showing the relation of the various components immediately after contact.

Figure 5 is another side view similar to Figures 3 and 4 developing a further stage of simultaneous pick-up and delivery.

Figure 6 is still another side view similar to Figures 3, 4, and 5 depicting a later stage of the simultaneous operations.

Figure 7 is a perspective view of a ground station bringing out a modification in which the ground based delivery unit is raised from the ground.

Figure 8 is a top plan view of the aircraft with parts of the fuselage broken away to bring out the location and construction of the chute for the container to be delivered.

Figure 9 is a side view partly in section and partly in elevation of the fuselage with parts of the latter broken away to bring out another arrangement for accommodating the container to be delivered.

Figure 10 is an enlarged detailed view of the delivery chute per se. This view is taken as a section through the chute with the container shown in elevation.

Figure 11 is an enlarged detailed view in side elevation of the outer end of the pick-up arm and hook carried thereby, and Figure 12 is a similar view of the outer end of the delivery arm.

Referring now to the drawings wherein like reference characters denote corresponding parts and first, more particularly to Figures 1 and 2, an aircraft such as adapted for air pick-up operations is referred to in its entirety by the reference character A. This aircraft may be of any of the well known models or constructions which are suitable to air pick-up usage. The aircraft A includes a fuselage 10 which houses a pick-up unit indicated in dotted lines at 11 in Figure 8. Pick-up units such as that represented at 11 are now well-known. As good illustrations of such pick-up units reference is made to the patents to Plummer, Nos. 2,373,413 and 2,373,414, both dated April 10, 1945. The fuselage 10 also includes a delivery chute such as that shown at 12 in Figure 9 or 13 in Figure 8. It will be noted that each of the delivery chutes 12 and 13 opens rearwardly of the fuselage.

Referring now more particularly to Figures 1 and 2, a pair of contact arms are shown at 14 and 15 respectively. These arms may be connected at the top by a common yoke or framework 16 which is preferably hingedly mounted on the underside of the fuselage 10. The particular manner in which the yoke 16 and arms 14 and 15 carried thereby are hingedly mounted is not an important part of this invention. All that is required is that the arms be susceptible of being withdrawn or retracted from the depending operative position. Obviously, this is necessary during landing and taking off and in order to minimize wind resistance the arms are lowered in the operative position only when a pick-up and delivery operation is to be made.

The particular construction of the contact arms 14 and 15 are also not a part of this invention. Contact arms such as this are now well-known and available to the public. Such arms are shown in the Plummer patents above referred to and include a track down which hooks may be slid prior to the pick-up and delivery operations.

The arm 14 is identified as the pick-up arm and at its lower or free extremity carries a hook represented somewhat diagrammatically at 17. The hook 17 is detachably held in position on the arm 14 in the manner illustrated and described in the above identified Plummer patents. A line 18 has its outer or free end connected to the hook 17 and this line passes through an opening into the interior of the fuselage 10 where it is taken up on the unit 11.

A hook 19 is similarly mounted on the outer or free end of the arm 15 and a line 20 has one end connected to this hook while its other end is connected to a container to be delivered as indicated at 21.

Referring now more particularly to Figure 10, the container to be delivered is therein depicted and identified in its entirety by the reference character C. This container has a rounded nose 22 which carries the connection 21 in the form of an eye. Regardless of the particular location of the chute as depicted in either Figure 8 or 9 the container C is yieldably held in position within the chute by the detents 23. There is preferably a detent 23 on each side of the chute in opposed relation. Each detent comprises a casing 24 that is attached to the wall of the chute and which encloses a rod 25 that is slidably mounted in the casing. The inner end of the rod 25 carries a shoe 26 which is shaped to conform to the curvature of the nose 22. A spring 27 yieldably urges the shoe 26 against the nose. It is evident that when a sufficient pull is exerted on the line 20, the nose 22 may be drawn past the shoes 26 retracting the latter against the influence of the springs 27 thereby withdrawing the container C from the chute.

Referring now again more particularly to Figures 1 and 2, a pick-up ground station is designated generally $G_1$ while the delivery ground station is designated $G_2$. The ground station $G_1$ comprises poles 28 and 29 which hold in an erected position a pick-up loop 30. The ground station $G_2$ comprises poles 29 and 31 which hold in an erected position a delivery loop 32. Each of the ground stations $G_1$ and $G_2$ taken individually present no invention. Ground stations of this general type are now well-known. One such ground station is illustrated and described in the patent to Plummer, No. 2,367,607, January 16, 1945, and substantially the same type of ground station is depicted in the patent to Ballard, No. 2,369,518, February 13, 1945. The novel feature of the ground stations $G_1$ and $G_2$ is that the pole 29 is common to the two.

It will be noted that the top ply of the loops 30 and 32 is held in position by releasable clips indicated at 33.

A container to be picked up is shown at 34 and this container is connected to the loop 30 by the connection shown at 35. A ground based delivery unit is shown at 36. The unit 36 includes a line 37 which is connected to the loop 32. The unit 36 is preferably a duplicate of the unit 11 which is mounted in the aircraft A. For the purposes of this specification the details of construction of the unit 11 needs here not be described. Either of the units shown in the first two Plummer patents herein identified may be employed as the ground based unit 36. It suffices to point out that such a unit includes a winch on which line 37 is taken up, braking instrumentalities associated with the winch, and time delay mechanism for controlling application of the brakes.

*Operation*

In describing the operation of the apparatus hereinbefore discussed, it will be assumed that the contact arms 14 and 15 are lowered into effective positions with the hooks 17 and 19 detachably held in position on the extremities of the arms. The container C to be delivered is positioned in the delivery chute and yieldably held therein by the detents 23. The ground stations $G_1$ and $G_2$ are erected and the container 34 to be picked up is connected to the loop 30.

As the pilot brings the aircraft in to make the simultaneous pick-up and delivery, the arms 14 and 15 engage the top plies of the loops 30 and 32 respectively. These top plies slide down the arms and engage the hooks 17 and 19 respectively.

The relative positions just before engagement is brought out in Figure 3. As the loop 30 pulls the hook 17 free of the arm 14, the line 18 together with the loop 30 are straightened out and the unit 11 is brought into operation to gradually accelerate the container 34 to the speed of the aircraft. At the same time the loop 32 pulls the hook 19 free of the arm 15 and straightens out the line 20. As this line becomes taut it pulls the container C from the delivery chute and the ground based unit 36 is brought into operation to gradually decelerate the container C from the speed of the aircraft and bring it to a stop. As the flight is continued the flight mechanic may operate the unit 11 in a well-known manner to reel in line 18 and bring the container 34 up into a position in which it may be drawn into the aircraft.

*First modification*

It is believed that under ordinary conditions the simultaneous pick-up and delivery above described may be carried out without a likelihood of the pick-up arm 14 engaging the delivery loop 32. However, recognizing that it is just possible for such a condition to arise, the invention proposes to guard against having the delivery loop connected to the pick-up line with resulting damage. Referring now more particularly to Figures 11 and 12, it will be noted that the pick-up hook 17 includes a bill 38 which is spaced from the arm 14 to provide a clearance 39. This clearance 39 is just great enough to accommodate the diameter of the pick-up loop 30 such as shown at 40. The pick-up loop 32 has a greater diameter as shown at 41 in Figure 12. The bill 42 of the delivery hook 19 provides a clearance 43 which accommodates this larger diameter loop. However, if the large diameter loop 41 should engage the arm 14 as by accident it would slide down the underface of the arm until it met the bill 38. As the clearance 39 is not sufficiently great to accommodate the larger loop 41 the latter will merely knock the hook off the arm but will not enter the hook and effect the connection.

*Second modification*

Referring now more particularly to Figure 7, it will be noted that a platform 44 is supported in an upraised position by supporting structure 45 at a location conveniently to one side of the ground station $G_2$. The ground based unit 36 is supported on this platform 44. It is evident that as the delivery line 20 and loop 32 become taut the container C to be delivered is stopped from the container C to be delivered is stopped from a point upraised from the ground surface. Thus, the braking instrumentalities which are included in the unit 36 are rendered effective to neutralize or counteract gravity action which causes the container to fall. Thus, not only is the forward or lateral velocity of the container gradually diminished, but the larger part of its fall under gravity action is arrested before the container strikes the ground.

While preferred specific embodiments of the invention are hereinbefore set forth, it is to be clearly understood that the invention is not to be limited to the exact constructions illustrated and described because various modifications of these details may be provided in putting the invention into practice within the purview of the appended claims.

What is claimed is:

1. In air pick-up and delivery apparatus, the combination of a pair of ground stations each presenting a loop adapted to be engaged by connecting means on an aircraft, an object to be picked-up connected to one of said loops, an energy absorbing unit operatively connected to the other of said loops, an aircraft, means on said aircraft to engage each of said loops, an object to be delivered connected to the means that is intended for connection with the loop connected to said energy absorbing unit, and a pick-up unit in said aircraft operatively connected to the means which is intended for connection with the loop connected to said object to be picked up.

2. In air pick-up and delivery apparatus, the combination of an aircraft, a pick-up unit on said aircraft, a delivery chute on said aircraft, an object to be delivered in said delivery chute, a pair of contact arms carried by said aircraft, a hook detachably carried at the free extremity of each contact arm, a line connecting one of said hooks with said unit, another line connecting the other of said hooks with said object to be delivered, a pair of ground stations arranged in side by side relation, each of said ground stations including a loop adapted to be engaged by one of said hooks, an object to be picked up connected to one of said loops, and an energy absorbing unit operatively connected to the other of said loops.

3. In air pick-up and delivery apparatus, the combination of an aircraft, a pick-up unit on said aircraft, a delivery chute on said aircraft, an object to be delivered in said chute, means for yieldably maintaining said object in said chute, a pair of contact arms hingedly mounted on said aircraft in side by side position, a pick-up hook detachably mounted to the free end of one of said arms, a line operatively connecting said pick-up hook with said pick-up unit, a delivery hook detachably carried at the free extremity of the other of said arms, a line connecting said delivery hook with said object to be delivered, a pair of ground stations in side by side position, each of said ground stations including a loop held in spread position by the respective station and adapted to be engaged by one of said hooks, an object to be picked up connected to the loop adapted for engagement by said pick-up hook, and an energy absorbing unit operatively connected to the loop intended for engagement with said delivery hook.

4. In air delivery apparatus, the combination of an aircraft including a delivery chute, means for yieldingly retaining an object to be delivered in said chute, a contact arm on said aircraft, a hook detachably carried at the free end of said arm, a line having one end connected to said hook and the other end adapted for connection to an object in said chute, a ground station including an erected loop, said loop being adapted for engagement by said hook, and an energy absorbing unit operatively connected to said loop.

5. Air delivery apparatus comprising an aircraft, a delivery chute in said aircraft opening rearwardly thereof, an object to be delivered in said chute, means for yieldably retaining said object in said chute, a contact arm depending from said aircraft, a hook detachably mounted on the free end of said arm, a line connecting said hook to said object, a ground station including a loop in erected position whereby it is adapted for engagement by said contact arm and hook, and an energy absorbing unit connected to said loop.

6. Air delivery apparatus comprising an aircraft, an object to be delivered on said aircraft, a ground station including a loop in erected position, means on said aircraft for effecting a connection between said object and said loop, an energy absorbing unit, and means for connecting said energy absorbing unit to said loop and rendering said unit effective at a point spaced above the ground on which said ground station is mounted substantially at the height of said loop.

7. Air delivery apparatus comprising an aircraft, an object to be delivered on said aircraft, a ground station including a loop in erected position and having a top ply spaced above the ground on which said station is mounted, means for effecting a connection between said loop and said object, an energy absorbing unit, a line connecting said energy absorbing unit to said loop, and means for supporting said line at a height substantially the same as the height of said top ply whereby said energy absorbing unit is rendered effective to counteract the gravity action of said object as it is delivered.

8. Air delivery apparatus comprising a supporting structure including a platform in upraised position, an energy absorbing unit on said platform, a ground station including an erected loop, a line connecting said loop to said unit, an aircraft, a delivery chute in said aircraft, an object to be delivered in said chute, means for yieldably retaining said object in said chute, a contact arm depending from said aircraft and adapted to engage said loop, a hook detachably mounted at the free end of said arm whereby it is adapted to effect a connection with said loop, and a line connecting said hook to said object.

9. In air pick-up and delivery apparatus, a pair of ground stations in side by side position, one of said ground stations including a pick-up loop having a predetermined diametrical dimension, an object to be picked up connected to said loop, the other ground station including a delivery loop having a substantially greater diametrical dimension, an energy absorbing unit operatively connected to said delivery loop, an aircraft, a pick-up unit on said aircraft, a pick-up arm depending from said aircraft, a pick-up hook detachably mounted on the free end of said arm, said hook having a bill that is spaced from said arm just sufficiently to provide clearance for accurately receiving said pick-up loop, a line connecting said hook to said pick-up unit, a delivery arm depending from said aircraft, a delivery hook detachably mounted on the free end of said arm, said delivery hook including a bill spaced from said arm sufficiently to provide clearance for receiving said delivery loop, an object to be delivered on said aircraft, and a line connecting said object to be delivered with said delivery hook.

ROBERT B. COTTON.